United States Patent
Jacobs et al.

(10) Patent No.: US 12,057,802 B2
(45) Date of Patent: Aug. 6, 2024

(54) TABBED STRUCTURAL BRACKET

(71) Applicant: KLOECKNER METALS CORPORATION, Roswell, GA (US)

(72) Inventors: Jeremy Jacobs, Sacramento, CA (US); Mark Schroeder, Rancho Cordova, CA (US); Brooke Stubben, Fair Oaks, CA (US)

(73) Assignee: Kloeckner Metals Corporation, Roswell, GA (US)

( * ) Notice: Subject to any disclaimer, the term of this patent is extended or adjusted under 35 U.S.C. 154(b) by 204 days.

(21) Appl. No.: 17/113,941

(22) Filed: Dec. 7, 2020

(65) Prior Publication Data

US 2021/0175842 A1 Jun. 10, 2021

Related U.S. Application Data (60) Provisional application No. 62/944,356, filed on Dec. 5, 2019.

(51) Int. Cl.
*H02S 30/10* (2014.01)
*F16B 7/18* (2006.01)

(52) U.S. Cl.
CPC .............. *H02S 30/10* (2014.12); *F16B 7/18* (2013.01)

(58) Field of Classification Search
CPC .......... H02S 20/00; H02S 20/10; H02S 20/20; H02S 20/32; H02S 30/00; H02S 30/10; F16B 7/18
See application file for complete search history.

(56) References Cited

U.S. PATENT DOCUMENTS

| | | | |
|---|---|---|---|
| 4,042,201 A * | 8/1977 | O'Callaghan | B60R 11/0205 292/87 |
| 6,123,314 A * | 9/2000 | Steele | F16B 21/09 248/681 |
| 6,138,583 A | 10/2000 | Erbs et al. | |
| 6,588,711 B2 * | 7/2003 | Onishi | F16B 37/045 248/221.11 |
| 7,240,803 B2 | 7/2007 | Stitchick et al. | |
| 7,260,918 B2 * | 8/2007 | Liebendorfer | H02S 20/00 52/173.3 |
| 7,387,212 B2 | 6/2008 | Costa et al. | |
| 7,866,099 B2 * | 1/2011 | Komamine | H02S 20/00 52/173.3 |
| 7,900,783 B2 | 3/2011 | Fernandez et al. | |
| 8,109,048 B2 * | 2/2012 | West | F24S 25/20 52/173.3 |
| 8,365,479 B2 | 2/2013 | Tucker | |
| 8,387,319 B1 * | 3/2013 | Gilles-Gagnon | F24S 25/33 52/173.3 |
| 8,713,881 B2 | 5/2014 | Dupont et al. | |
| 8,813,440 B2 * | 8/2014 | Potter | H02S 20/00 52/173.3 |

(Continued)

*Primary Examiner* — Patrick D Hawn
(74) *Attorney, Agent, or Firm* — Fitzpatrick PC

(57) ABSTRACT

A structural bracket for use with a solar mounting system is provided. The bracket has a first planar portion, and a second planar portion angularly positioned relative to the first planar portion, a mounting tab coupled to the second planer portion proximate a distal end of the second planer portion and a hook extending outwardly from the mounting tab at an angle, wherein the hook is configured to securely lock the structural bracket to a mating beam using an interference fit.

22 Claims, 6 Drawing Sheets

(56) References Cited

U.S. PATENT DOCUMENTS

| | | | |
|---|---|---|---|
| 8,955,259 B2* | 2/2015 | Hemingway | H02S 20/23 52/24 |
| 8,962,972 B2* | 2/2015 | Sagayama | H02S 20/23 136/251 |
| 9,339,108 B2 | 5/2016 | Zang et al. | |
| 10,154,739 B2 | 12/2018 | Turner et al. | |
| 10,211,774 B2* | 2/2019 | Zhu | H02S 30/10 |
| 10,342,332 B2 | 7/2019 | Kassanoff et al. | |
| 2004/0055514 A1 | 3/2004 | De Land et al. | |
| 2010/0154784 A1* | 6/2010 | King | F24S 80/40 126/623 |
| 2013/0091786 A1* | 4/2013 | DuPont | F24S 25/615 52/173.3 |
| 2020/0304057 A1* | 9/2020 | Suan | H02S 20/32 |
| 2021/0320620 A1* | 10/2021 | Jacobs | H02S 30/00 |
| 2022/0029576 A1* | 1/2022 | Jacobs | F16M 11/18 |

* cited by examiner

TABBED STRUCTURAL BRACKET

CROSS-REFERENCE TO RELATED APPLICATIONS

This application claims the benefit of U.S. Provisional Patent Application Ser. No. 62944356 filed Dec. 5, 2019 entitled Tabbed Structural Bracket, the entire contents of which are incorporated by reference herein for all purposes.

FIELD OF THE INVENTION

The present invention generally relates to structural brackets. More specifically, the present invention relates to a tabbed structural bracket configured to lock rotation of mechanical assemblies and eliminate the need for additional fasteners.

BACKGROUND OF THE INVENTION

Commercially, there are a numerous number of brackets available in the market, for example, angle brackets and L-shaped brackets. Generally, for heavy industrial use, brackets are fabricated using steel sheet metal having a first leg and a second leg oriented at a desired angle relative to each other. Each leg is a narrow strip with one or more holes for screwing it to other support structures/frames. These brackets are used as support brackets for mounting various types of structures such as solar panels, air conditioners, ventilation systems, and other heavy equipment.

A solar module, which is comprised of photovoltaic cells, is an electrical device that converts the energy of light directly into electricity by the photovoltaic effect. Solar cells are the building blocks of photovoltaic modules, otherwise known as solar panels.

Solar mounting and racking systems must be installed in sun or light exposed area. Most often, it is desirable to mount solar panels outdoors at an angle from the horizontal so that they will more directly face the sun during peak daylight hours, rather than being mounted flat to the ground or another surface. Many times, many solar panels are mounted together to form a solar panel array, which may utilize hundred or even thousands of solar panels. Mounting and racking systems are a critical cost component in any solar field.

A typical solar mount racking system require a very large amount of screws or other types of fasteners to ensure the assembly has the structural integrity required to last many years in harsh and windy environments. These screws, due to the vast number required, add significant cost to these structures and have an adverse effect on margins.

Known mounting brackets or structural brackets are fastened to a mating beam via fasteners such as bolts or heavy duty bolts or screws. The mounting bracket and the mating beam are positioned in such a way to align holes so that treaded bolts together with nuts mount the mounting bracket to the mating beam. Again however, the existing bracket requires a greater number of bolts and nuts to fix a similar mechanical assembly. In addition, it requires more labor and additional assembly time.

Therefore, there is a need for an improved design to lock rotation of mechanical assembly and eliminate the need for additional fasteners.

SUMMARY OF THE INVENTION

To achieve the foregoing and other aspects and in accordance with the purpose of the invention, the subject invention provides a tabbed structural bracket (hereinafter referred as structural bracket).

The structural bracket has with a mounting tab and hook to lock rotation of the mechanical assembly and eliminate the need for additional fasteners.

The structural bracket is for use with solar mounting assemblies, but may be used in other fields in which fasteners are desirable.

In one embodiment, the structural bracket is used for making a connection between two structural members. The structural bracket is fabricated using materials including, but not limited to, steel, aluminum, durable engineering plastic, or other suitable materials. The structural bracket could be galvanized or painted to avoid corrosion due to long-time use or ambient conditions.

The the structural bracket comprises a first planar portion and a second planar portion. The first planar portion and the second planar portion may be approximately the same size and shape. In one embodiment, the planar portions are rectangular in shape. In one embodiment, the second planar portion is angularly positioned to the first planar portion at an angle of approximately ninety degrees to form an L-shaped configuration. The second planar portion comprises a mounting tab. In one embodiment, the mounting tab is positioned at a distal end of the second planar portion. In one embodiment, the second planar portion further comprises at least one pre-drilled or pre-tapped aperture. In one embodiment, the aperture is a circular or round through-hole/opening positioned on the surface of the second planar portion.

In embodiments, the structural bracket is fastened to the mating beam using the mounting tab and hook. The mating beam comprises one or more pre-punched through-holes or apertures including, a first through-hole and a second through-hole. The mounting tab is configured to snugly fit into the first through-hole and the hook is configured to lock rotation of the mating beam. Further, at least one fastener extends via the second through-hole and the aperture to fasten the mating beam and the structural bracket. The mounting tab locks rotation of the mating beam eliminates the need for a separate fastener to lock rotation.

In embodiments, the mounting tab eliminates the need for additional fasteners (e.g., bolts) required to fasten the structural bracket to the mating beam. In one embodiment, the fastener is a threaded bolt or screw having a head, a threaded shaft extends from the screw head, and a threaded nut. The threaded shaft travels through the second through-hole and the aperture to fasten the mating beam and the structural bracket.

In embodiments, the structural bracket comprises a first planar portion, and a second planar portion angularly positioned relative to the first planar portion; a mounting tab coupled to the second planer portion proximate a distal end of the second planer portion; a hook extending outwardly from the mounting tab at an angle, wherein the hook is configured to securely lock the structural bracket to a mating beam using an interference fit.

In embodiments, a solar mounting system for mounting a solar module of a solar module array is provided. The system comprises a plurality of mounting legs; a frame coupled to the mounting posts, wherein the frame configured to support at least one solar cell, and wherein the frame comprises a plurality of mating beams; a plurality of structural brackets, wherein the structural brackets are configured to be securely fixed to the mating means, wherein the plurality of structural brackets comprise a first planar portion and a second planar portion angularly positioned relative to the first planar portion; a mounting tab coupled to the second planer portion proximate a distal end of the second planer portion; and a hook extending outwardly from the mounting tab at an angle, wherein the hook is configured to securely lock the structural bracket to a mating beam using an interference fit.

Other features, advantages, and aspects of the present invention will become more apparent and be more readily understood from the following detailed description, which should be read in conjunction with the accompanying drawings.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention is best understood by reference to the detailed description and examples set forth herein.

Embodiments of the invention are discussed below with reference to the examples. However, those skilled in the art will readily appreciate that the detailed description given herein with respect to these examples is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Figure 1:
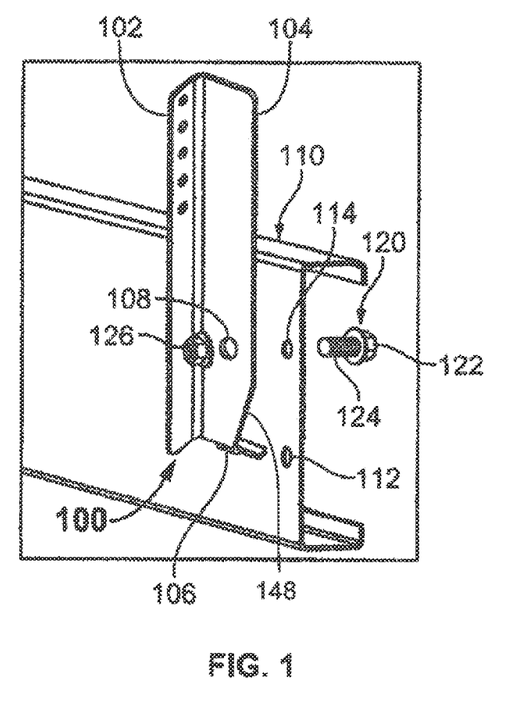
FIG. 1 is a perspective view a tabbed structural bracket with a mating beam according to one embodiment of the present invention.

Referring now to FIG. 1, an exploded view of a tabbed structural bracket (hereinafter referred as structural bracket) 100 is fastened with a mating beam 110, according to one embodiment of the present invention. The structural bracket 100 is used for fastening at least two structural members of devices, for example, a solar mounting assembly. In one embodiment, the structural bracket 100 is an L-shaped purlin bracket but may be any type of bracket is contemplated herein. The structural bracket 100 is formed by bending a sheet of metal material. The structural bracket 100 may be formed by welding or joining multiple metal pieces together. In some embodiments, the structural bracket 100 is fabricated using materials including, but not limited to, steel, aluminum, durable engineering plastic, or other suitable materials. The structural bracket 100 may be galvanized or painted to avoid corrosion over time.

In one embodiment, the structural bracket 100 comprises a first planar portion 102 and a second planar portion 104. The first planar portion 102 and the second planar portion 104 may have the same size and shape or be dimensioned such that the second planar portion 104 has a bottom portion 148 that is angled inwardly. The second planar portion 104 is angularly joined to the first planar portion 102 at an angle of approximately 90 degrees to form an L-shaped configuration.

The second planar portion 104 comprises a mounting tab 106 with a hook portion (shown in FIGS. 2-8). In one embodiment, the mounting tab 106 is positioned at a distal end of the second planar portion 104. In one embodiment, the second planar portion 104 further comprises at least one pre-drilled or pre-tapped aperture 108 which is a circular or round through-hole, but may be of any useful shape. While as shown the mounting tab 106 is shown toward the distal or bottom end and the aperture 108 is show above the tab, in optional embodiments, the tab may be located toward the middle or top of the bracket, and the aperture 108 located toward a bottom of distal end.

In one embodiment, the mating beam 110 is a C-shaped purlin/beam. The mating beam 110 may be manufactured from a kind of carbon structural steel or high tensile galvanized steel material. The mating beam 110 comprises one or more pre-punched through-holes including a first through-hole 112 and a second through-hole 114. In one embodiment, the structural bracket 100 is fastened to the mating beam 110 using the mounting tab 106, hook (shown in FIGS. 2-8), and a fastener 120 such as a bolt or screw and nut.

Figure 2:
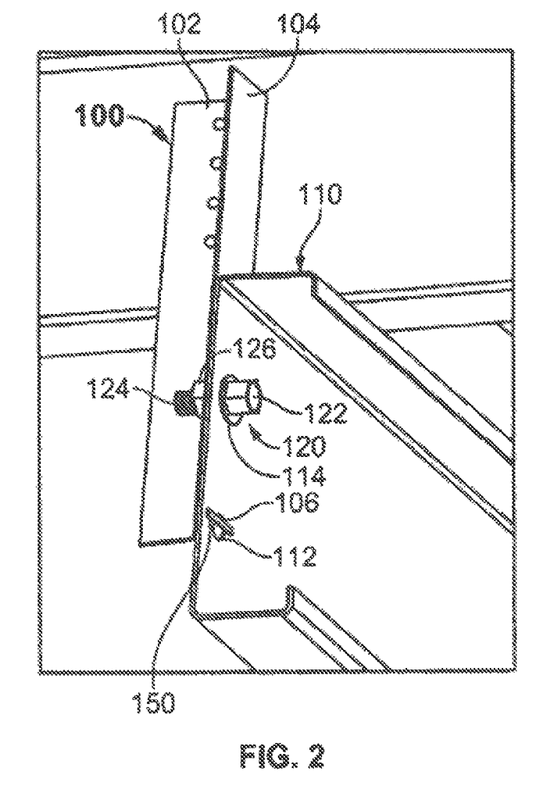
FIG. 2 is a perspective view of the structural bracket fastened to the mating beam according to one embodiment of the present invention.

Referring now to FIG. 2, the structural bracket 100 fastened to the mating beam 110, according to one embodiment of the present invention is shown. The structural bracket 100 comprises the first planar portion 102 and the second planar portion 104. In one embodiment, the second planar portion 104 is angularly positioned relative the first planar portion 102 at an angle of approximately 90 degrees to form the L-shaped configuration. The second planar portion 104 comprises the mounting tab 106 and hook 150 positioned at its distal end. In one embodiment, the second planar portion 104 further comprises at least one pre-drilled or pre-tapped aperture 108.

In operation, the mounting tab 106 and the aperture 108 are configured to fasten the structural bracket 100 to the mating beam 110. So that it may be used with varying solar mounting equipment, the mating beam 110 comprises one or more pre-punched through-holes including the first through-hole 112 and the second through-hole 114. In one embodiment, the first through-hole 112 is configured to receive the mounting tab 106 and hook 150, whereas the second through-hole 114 is configured to align with the aperture 108 to receive the fastener 120 (e.g., bolt and nut).

In one embodiment, the structural bracket 100 is fastened to the mating beam 110 using the mounting tab 106, and the hook 150 is configured to secure the bracket to the mating beam so that the bracket and beam are securely mounted and will not come apart in adverse conditions such as high wind. In this way, the hook 150 acts as a locking mechanism that actuates when the user rotates the bracket 100. The mounting tab 106 fastens the structural bracket 100 and the mating beam 110 by positioning through first through-hole 112 and the hook 150 acts as a lock based on an interference hit when rotated. In one embodiment, the mounting tab 106 and lock 150 is configured to snugly fit into the first through-hole 112 to prevent the rotation of the mating beam 110 once locked into place with the hook 150. In one embodiment, the mounting tab 106 eliminates the need for additional fasteners which the fastener 120 fastens the mating beam 110 and the structural bracket 100. The fastener 120 is a threaded screw having a screw head 122, a threaded shaft 124 extends from the screw head 122, and a threaded nut 126. The threaded shaft 124 of the fastener 120 travels through the second through-hole 114 and the aperture 108 and tightened using the nut 126, thereby fastening the mating beam 110 and the structural bracket 100. In one embodiment, the fastener 120 provides structural strength to the assembly such as solar modules.

During installation, the structural bracket 100 and the mating beam 110 are fastened or fixed together using the mounting tab 106, hook 150 and the fastener 120. In one embodiment, the mounting tab 106 snugly fits into the first through-hole 112 of the mating beam 110. In one embodiment, the mounting tab 106 is configured to securely fasten the structural bracket 100 with the mating beam 110 to prevent rotation of the mating beam 110 without the need for additional fasteners. The fastener 120 provides additional structural strength to the assembly.

Figures 3, 4:
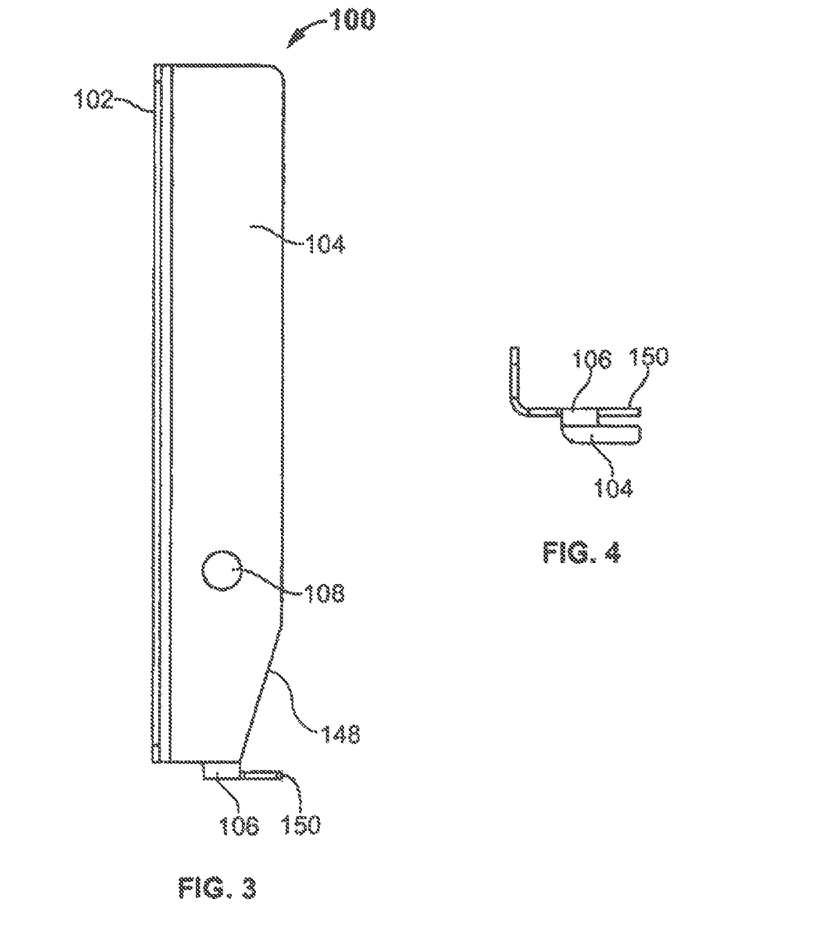
FIG. 3 is a front view of the structural bracket according to one embodiment of the present invention.
FIG. 4 is a bottom view of the structural bracket according to one embodiment of the present invention.

Referring now to FIG. 3 a front view the bracket 100 is shown. As shown, the second planer portion 104 can be seen together with aperture 108, and angled portion 148. As can be seen, the angled portion is inwardly angled at approximate I 0-15 degrees. This angle portion or "cut out" allows the user greater ability to rotate the bracket in short spaces, and further, allows for the mounting tab 106 to be positioned at a distal corner of the second planer portion 104 rather than a distal middle portion of the second planer portion 104. This placement increases structural integrity of the bracket mounting tab with relation to the bracket and makes it easier for the user to properly rotate the bracket during installation so that the hook portion 150 locks the bracket in place via interference fit. The mounting tab 106 and hook 150, as shown, have a L-shaped configuration in relation to each other, though they are formed in one-piece construction but may be two pieces welded to the other so long as the structural integrity is commensurate with the end-use. In optional embodiments, the mounting tab 106 and hook 150 may be coupled via bearing or any type of joint that allows for rotational motion, or a joint that allows for six degrees of freedom. In this embodiment, a lock mechanism is provided to lock the hook into places when the desired angle is reached by the user.

Referring now to FIG. 4, a bottom view of the bracket 100 is shown for purposes of orientation. As can be seen, the hook 150 has a length that is approximately twice the width of the mounting tab 106 when viewed from the bottom.

Figure 5:
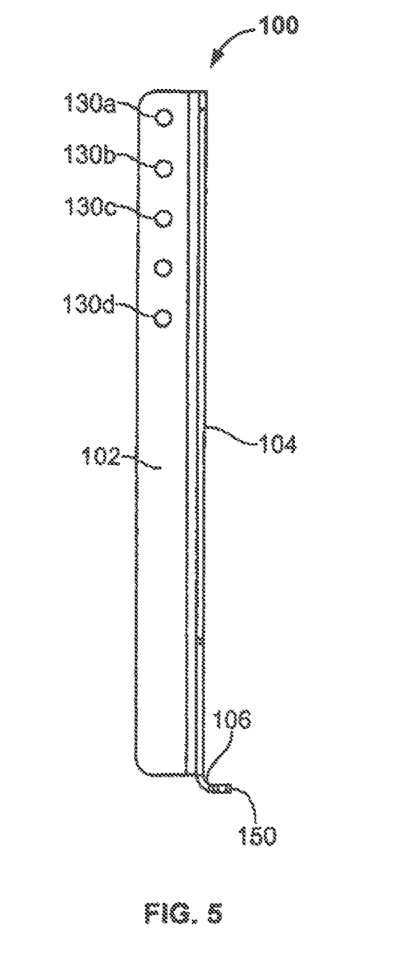
FIG. 5 is a side view of the structural bracket according to one embodiment of the present invention.

Referring now to FIG. 5, a back view of the bracket 100 is shown. As shown, the first planar portion 102 can be seen together with mounting holes 130a, 130b, 130c and 130d (n+1). These mounting holes allow the user to use the bracket with any number of designs, or in other embodiments, use all mounting holes to increase structural integrity whilst coupling to another bracket or portion of a structure such as a solar mounting system. For purposes of orientation, the mounting tab 106 and hook 150 can be seen extending from the second planer portion 104. The hook 150 may extend from the planar portion from the left, right, upwardly or downwardly, a leftward extension is shown herein.

Figure 6:
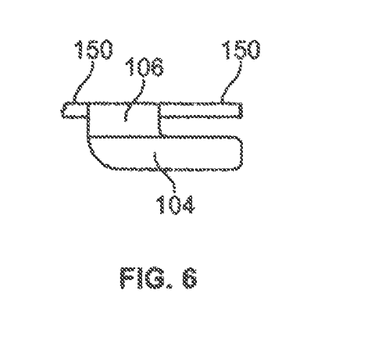
FIG. 6 is blown up bottom view of the structural bracket according to one embodiment of the present invention.

Referring now to FIG. 6, a blown-up bottom view of FIG. 4. As can be seen, the hook 150 has a length that is approximately twice the width of the mounting tab 106 when viewed from the bottom, and also as a width that is approximately equal to the width of the mounting tab 106 for increased strength. It must be dimensioned to fit into the aperture of the elements it is mounted to.

Figure 7:
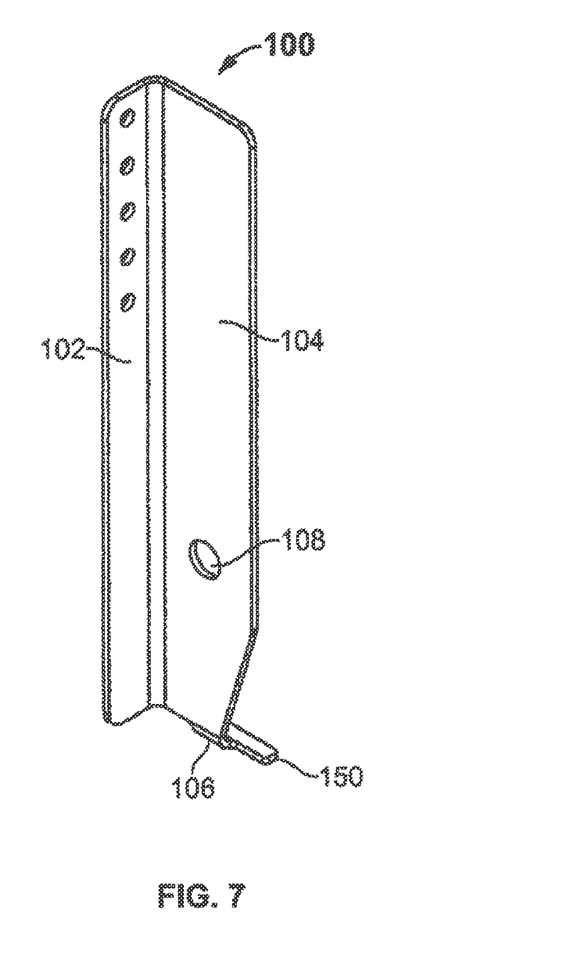
FIG. 7 is a perspective side view the structural bracket according to one embodiment of the present invention.

Referring now to FIG. 7, a perspective side view of the structural bracket according to one embodiment of the present invention is shown. The structural bracket 100 comprises the first planar portion 102 and the second planar portion 104. The second planar portion 104 comprises the mounting tab 106 and hook 150 positioned at its distal end. In one embodiment, the second planar portion 104 further comprises at least one pre-drilled or pre-tapped aperture 108.

Figure 8:
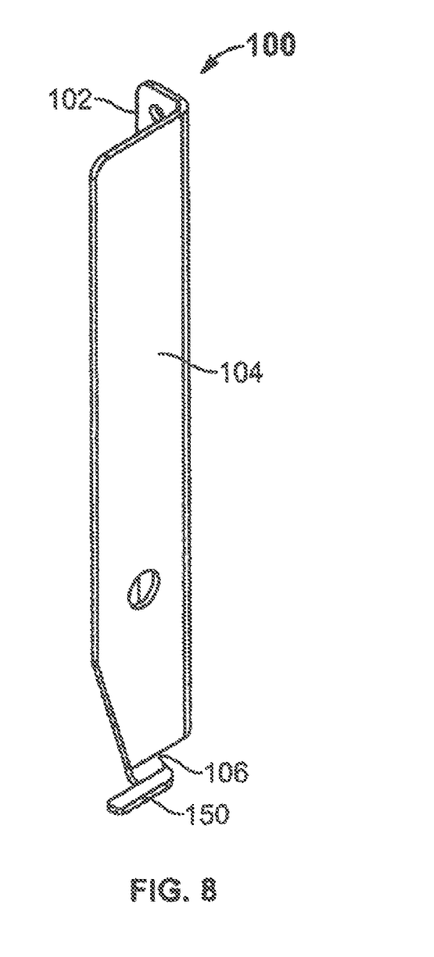
FIG. 8 is an opposite side view of the structural bracket according to one embodiment of the present invention.

Referring now to FIG. 8, an opposite perspective view is shown. As can be seen, the mounting tab 106 extends both downwardly and outwardly from the second planer portion 104, and the hook extends leftwardly (although may be rightwardly) from the mounting tab 106. Each of the mounting tab and hook may be of similar thickness to provide appropriate strength.

In operation, a user provides the bracket 100 while constructing a solar mount, generally on site. The user inserts the hook 150 into the aperture or mating hole of the mating beam 110, and during insertion, the bracket is at an angle between 10 and 45 degrees off center. Once the hook 150 is inserted into through-hole 112, the user uses a twisting motion to insert the mounting tab 106 into through-hole 112, at which point the bracket screw hole 108 is aligned with the mating beam hole 114 so that user can fix the top portion of the bracket to the beam.

In one embodiment, the mounting tab 106 eliminates the need for additional fasteners, for example, a second fastener used in the conventional structural brackets, to fasten the structural bracket 100 with the support structure, such as the mating beam 110. In one embodiment, the mounting tab 106 is a rotation-locking tab, which eliminates the need of a ½-13" serrated flange bolt connection to prevent the rotation. In another embodiment, the structural bracket 100 could be used with any square mechanical assemblies.

Figure 9:
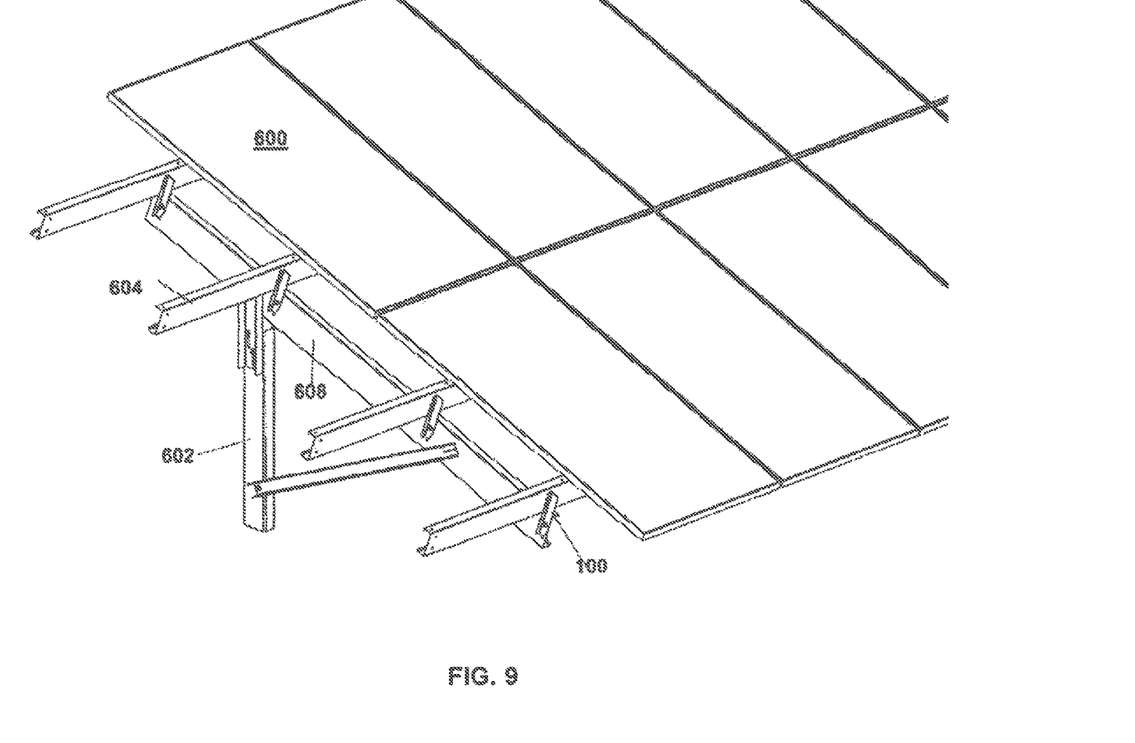
FIG. 9 is a perspective view of a solar module system utilizing the tabbed bracket in an embodiment of the present invention.

Referring now to FIG. 9, a solar mounting system is shown. The photovoltaic or solar cell 600 is mounted to frame that supports the cell. The frame is coupled to mounting legs or posts 602, a mating beam 604 and a slant beam 608. A plurality of structural brackets 100 are shown which attach the mating beam 604 to the slant beam 608.

The advantages of the present invention include, but ae not limited to, eliminating the need for additional mounting holes/apertures and fasteners to mount the structural bracket 100 with the mating beam 110. The structural bracket 100 eliminates at least 4 connection points per foundation in the solar mounting assembly, for example, approximately 160,000 connectors are replaced with the structural brackets per 100 MW. In addition, the structural bracket 100 maintains the structural integrity of the mounting assembly. Further, the structural bracket 100 reduces part weight and material. The structural bracket 100 is easily latched/connected with the mating beam 110. Therefore, the structural bracket 100 has reduced assembly time and labor costs. The structural bracket 100 could also be used with square mechanical assemblies or any other mechanical assemblies regardless of fastener count.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A structural bracket, comprising:
a first planar portion, wherein the first planar portion comprises at least one mounting hole positioned therethrough, wherein the at least one mounting hole is configured to attach to a structure of a solar mounting rack;
a second planar portion angularly positioned at an approximately adjacent angle relative to the first planar portion to form an L-shaped configuration, wherein the second planar portion comprises:
a mounting tab extending from an edge of the second planar portion, wherein the edge is adjacent to and extends perpendicularly from the first planar portion, and wherein the mounting tab curvedly extends from the second planar portion in a direction away from relative to the first planar portion;
a hook extending from the mounting tab at an angle approximately parallel to the second planar portion, wherein when the mounting tab is mated with a mating beam, the hook is configured to rotate about the mating beam and securely lock the structural bracket to fit the mating beam using an interference fit, wherein the hook extends orthogonally from the mounting tab in a direction perpendicular to the first planar portion.

2. The structural bracket of claim 1, wherein second planar portion comprises a cut out portion at the edge.

3. The structural bracket of claim 2, wherein the mounting tab is located at the cut-out portion on a corner of the edge.

4. The structural bracket of claim 1, wherein the hook extends leftwardly, rightwardly or both, from the mounting tab.

5. The structural bracket of claim 1, further comprising at least one pre-drilled or pre-tapped aperture configured to mate with the mating beaming using a fastener, wherein the fastener is a threaded bolt and nut.

6. The structural bracket of claim 1, wherein the hook is actuated via a rotational force provided by a user.

7. The structural bracket of claim 1, wherein the bracket is configured to attach structural elements of a solar mounting array.

8. The structural bracket of claim 1, wherein the structural bracket is formed of galvanized steel.

9. The structural bracket of claim 1, wherein the hook is longer in a direction of extension from the mounting tab than the mounting tab is wide in the direction of extension.

10. The structural bracket of claim 1, wherein the mounting tab is further mated with an aperture of a mating beam by extension through the aperture of the mating beam.

11. The structural bracket of claim 1, wherein the hook further extends in a direction away from or towards the first planar portion.

12. The structural bracket of claim 1, wherein the edge is smaller in length than another edge of the second planar portion that is opposite to and distant from the first planar portion.

13. A solar mounting system for mounting a solar module of a solar module array, the system comprising:
a plurality of mounting posts;
a frame coupled to the mounting posts, wherein the frame configured to support at least one solar cell, and wherein the frame comprises:
a plurality of mating beams;
a plurality of structural brackets, wherein the structural brackets are configured to be securely fixed to the mating beams, wherein the plurality of structural brackets comprise:
a first planar portion wherein the first planar portion comprises at least one mounting hole positioned therethrough, wherein the at least one mounting hole is configured to attach to a structure of a solar mounting system
a second planar portion angularly positioned at an approximately adjacent angle relative to the first planar portion to form an L-shaped configuration, wherein the second planar portion comprises:
a mounting tab extending from an edge of the second planar portion, wherein the edge is adjacent to and extends perpendicularly from the first planar portion, and wherein the mounting tab curvedly extends from the second planar portion in a direction away from relative to the first planar portion;

a hook extending from the mounting tab at an angle approximately parallel to the second planar portion, wherein when the mounting tab is mated with an aperture of a mating beam by extension through an aperture of the mating beam, the hook is configured to rotate about the mating beam and securely lock the structural bracket to ft the mating beam using an interference fit, wherein the hook extends orthogonally from the mounting tab in a direction perpendicular to the first planar portion.

14. The solar mounting system of claim 13, wherein the second planar portion comprises a cut out portion at the edge.

15. The solar mounting system of claim 14, wherein the mounting tab is located at the cutout portion on a corner of the edge.

16. The solar mounting system of claim 13, wherein the hook extends leftwardly or be rightwardly from the mounting tab.

17. The solar mounting system of claim 13, wherein the bracket comprises at least one pre-drilled or pre-tapped aperture configured to mate with the mating beaming using a fastener, wherein the fastener is a threaded bolt and nut.

18. The solar mounting system of claim 13, wherein the hook is actuated via a rotational force provided by the user to connect the plurality of brackets to the plurality of mating beams to form the frame which is attached to the mounting posts.

19. The solar mounting system of claim 13, wherein the hook is longer than the mounting tab is wide.

20. The solar mounting system of claim 13, wherein the mounting tab is further mated with an aperture of a mating beam by extension through the aperture of the mating beam.

21. The solar mounting system of claim 13, wherein the hook further extends in a direction away from or towards the first planar portion.

22. The solar mounting system of claim 13, wherein the edge is smaller in length than another edge of the second planar portion that is opposite to and distant from the first planar portion.

* * * * *